ized under 35

(12) United States Patent
Schmidt

(10) Patent No.: US 10,795,455 B2
(45) Date of Patent: Oct. 6, 2020

(54) PROJECTOR HAVING A CONTACT-FREE CONTROL

(71) Applicant: Robert Bosch GmbH, Stuttgart (DE)

(72) Inventor: Felix Schmidt, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/326,794

(22) PCT Filed: Jun. 23, 2017

(86) PCT No.: PCT/EP2017/065480
§ 371 (c)(1),
(2) Date: Feb. 20, 2019

(87) PCT Pub. No.: WO2018/036685
PCT Pub. Date: Mar. 1, 2018

(65) Prior Publication Data
US 2019/0196606 A1    Jun. 27, 2019

(30) Foreign Application Priority Data

Aug. 23, 2016  (DE) .................. 10 2016 215 746

(51) Int. Cl.
*G06F 3/03*      (2006.01)
*G06F 3/01*      (2006.01)
(Continued)

(52) U.S. Cl.
CPC .......... *G06F 3/0304* (2013.01); *G03B 21/00* (2013.01); *G03B 21/54* (2013.01); *G06F 3/011* (2013.01); *G06F 3/017* (2013.01)

(58) Field of Classification Search
CPC ........ G06F 3/0304; G06F 3/011; G06F 3/017; G03B 21/00; G03B 21/54; B60K 2370/334
See application file for complete search history.

(56) References Cited

U.S. PATENT DOCUMENTS 6,353,428 B1 * 3/2002 Maggioni ............. G06F 3/0425
345/157
8,408,720 B2 * 4/2013 Nishigaki ............. G06F 3/0425
345/179
(Continued)

FOREIGN PATENT DOCUMENTS

DE    102014210399 A1    12/2015
JP       H11501419 A      2/1999
(Continued)

OTHER PUBLICATIONS

International Search Report for PCT/EP2017/065480, dated Aug. 28, 2017.

*Primary Examiner* — Tom V Sheng
(74) *Attorney, Agent, or Firm* — Norton Rose Fulbright US LLP; Gerard Messina

(57) ABSTRACT

A projector is provided, which has a plurality of operating modes, including a first operating mode in which a beam of electromagnetic waves is emitted by the projector. In addition, a detection unit is configured in such a way that in the first operating mode of the projector the presence of an object in the optical path of the beam is detected. Moreover, the projector includes a processing unit which is developed to switch from the first operating mode to a second operating mode that differs from the first operating mode when an object is detected in the optical path of the beam.

20 Claims, 2 Drawing Sheets

(51) Int. Cl.
*G03B 21/00* (2006.01)
*G03B 21/54* (2006.01)

(56) References Cited

U.S. PATENT DOCUMENTS

| | | | | |
|---|---|---|---|---|
| 9,465,484 | B1* | 10/2016 | Kamarshi | G06F 3/042 |
| 9,606,637 | B2* | 3/2017 | Chikaoka | H04N 9/3164 |
| 10,234,826 | B2* | 3/2019 | Lee | G06F 3/0304 |
| 2005/0151933 | A1* | 7/2005 | Tsai | G03B 21/18 |
| | | | | 353/57 |
| 2005/0245302 | A1* | 11/2005 | Bathiche | A63F 13/00 |
| | | | | 463/1 |
| 2007/0081143 | A1* | 4/2007 | Mau | G01P 13/00 |
| | | | | 356/28 |
| 2008/0244468 | A1 | 10/2008 | Nishihara et al. | |
| 2012/0120028 | A1* | 5/2012 | Kiyose | G06F 3/0304 |
| | | | | 345/175 |
| 2013/0069994 | A1* | 3/2013 | Nishigaki | H04N 9/3161 |
| | | | | 345/690 |
| 2013/0314380 | A1* | 11/2013 | Kuribayashi | G06F 3/0425 |
| | | | | 345/175 |
| 2014/0240681 | A1* | 8/2014 | Izukawa | G06F 3/0423 |
| | | | | 353/85 |
| 2014/0293231 | A1 | 10/2014 | Yoon et al. | |
| 2015/0185828 | A1* | 7/2015 | Wu | G02B 27/017 |
| | | | | 345/156 |
| 2015/0193000 | A1* | 7/2015 | Hu | G06F 3/017 |
| | | | | 345/156 |
| 2015/0205377 | A1* | 7/2015 | Koyama | G06F 3/0325 |
| | | | | 345/156 |
| 2016/0103497 | A1 | 4/2016 | Yamaguchi et al. | |

FOREIGN PATENT DOCUMENTS

| | | |
|---|---|---|
| JP | 2000305481 A | 11/2000 |
| JP | 2005031526 A | 2/2005 |
| JP | 2010127972 A | 6/2010 |
| JP | 2011197645 A | 10/2011 |
| JP | 2015080218 A | 4/2015 |
| JP | 2016062056 A | 4/2016 |
| WO | 2016021022 A1 | 2/2016 |
| WO | 2016098519 A1 | 6/2016 |

* cited by examiner

PROJECTOR HAVING A CONTACT-FREE CONTROL

FIELD OF THE INVENTION

The present invention relates to a projector having different operating modes, and to a device, preferably a mobile device, in which the projector is installed.

BACKGROUND INFORMATION

Scanning laser projectors can be used to generate images on projection surfaces. In the process, the laser beams are modulated in terms of imaging technology and guided in a controlled manner on a projection surface with the aid of a mirror module. An infrared laser for measuring light dispersed at objects may also be used.

SUMMARY

According to the present invention, a projector is provided, which has a plurality of operating modes, including a first operating mode in which the projector emits a beam of electromagnetic waves. Furthermore, a detector unit, which in the first operating mode of the projector is configured in such a way that it detects the presence of an object in the optical path of the beam. In addition, the projector includes a processing unit, which is developed to switch from the first operating mode to a second operating mode which differs from the first operating mode when an object is detected in the optical path of the beam.

The projector according to the present invention has the advantage that a switch between different operating modes of a projector is possible in a contact-free manner. For example, this has direct hygienic advantages which may be advantageous especially in hygienically critical areas such as in medical applications. In an advantageous manner, the realization of the present invention furthermore requires barely any additional technical outlay. For instance, a processing unit may be represented by one or more digital switching circuit(s). Counted among the objects, for example, are objects that are moved by a user. These may be pens, coffee cups or other kitchen devices. The object is preferably a hand of a user.

In the second operating mode of the projector, the detector unit is preferably configured to detect the presence of an object in the optical path of the beam, and a processing unit is developed to switch from the second operating mode to a first operating mode which differs from the second operating mode when an object is detected in the optical path of the beam. In an advantageous manner, it is therefore possible to switch back and forth between the operating modes in both directions and in a contact-free manner.

The projector is preferably a laser projector.

The first operating mode is preferably an energy saving mode. This makes it possible to wake up the projector from the energy saving mode or to set it to such a mode using an object detection. In an energy saving mode, corresponding savings in power are possible.

In the first operating mode, the beam is developed as a non-scanning beam. For example, this may be a laser-pointer mode. The beam may have the color red, green or blue, for instance, or else also have different colors or frequencies. This saves energy.

In the energy saving mode of the projector, the detector unit is configured so that it is able to be operated in an energy saving mode. This advantageously makes it possible to save energy or current.

The detector unit is preferably developed to detect a gesture of a user. A gesture is an interaction by a movement made by a person.

In the first operating mode, the beam may be made up of electromagnetic waves in the non-visible range of the spectrum. For instance, a projector operating as a laser pointer may lie in a spectral range that is invisible to the human eye, e.g., in the infrared spectrum.

The second operating mode is preferably distinguished from the first operating mode by a change in the color of the beam. In such a case the projector may easily switch between two color states. This may be useful and advantageous for presentation purposes, for instance.

The second operating mode of the projector may be configured in such a way that the beam is scanned across the projection surface with the aid of a mirror module. This corresponds to a typical operating mode of a laser projector.

The detection of an object in the optical path of the beam is able to be carried out with and without synchronization signals.

In contrast to the second operating mode, in the first operating mode one or a plurality of light source(s) of the projector is switched off or has a lower intensity. A light source may be a laser, for example. This makes it possible to save power.

The detector unit may be a photodiode, a CCD camera, a CMOS camera, or a proximity sensor.

In addition, a device is provided, preferably a mobile telephony device, which includes a projector as described in one of the above developments. A device of this type may be used as a pointer device, for example, such as during presentations. Using a hand, an object or gestures, users may achieve an uncomplicated switchover between different colors of the lasers or any mixed values of the colors. For instance, this may be done so that certain information is emphasized. In addition, the intensity of the laser beam is variable, whereby the intensity of the brightness of the spot is varied, for example.

The method according to the present invention for the contact-free control of a projector basically encompasses the following steps: In a first step a), a projector according to one of the above developments is provided. In a second step b), the detector unit generates a signal when the detector units detects the presence of an object in the optical path. In a further step c), the signal is conveyed to the processing unit. In a further step d), the operating mode of the projector is varied on the basis of the signal. Advantages result from the advantages of the afore-described projector and device.

Advantageous further developments of the present invention are indicated in the dependent claims and described in the description.

DETAILED DESCRIPTION

Figure 1:
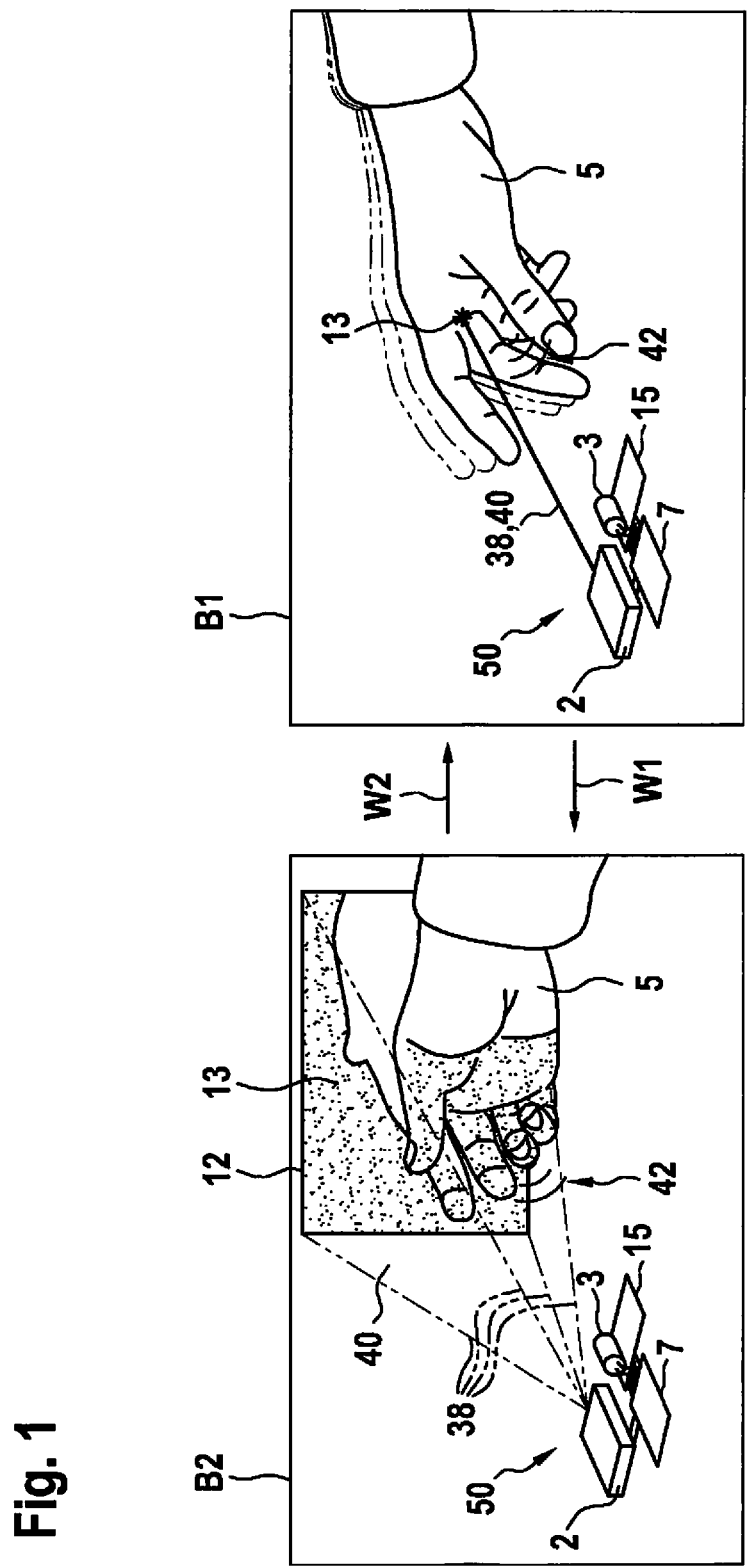
FIG. 1 shows a projector according to the present invention featuring a switch between different operating modes.

In FIG. 1, a projector 2 according to the present invention and the switch between two different operating modes B1, B2 is described. FIG. 1 includes a right partial figure and a left partial figure, a first operating mode B1 being shown in the right partial figure and a second operating mode B2 being shown in the left partial figure. Both partial figures show a projector 2, which preferably is developed as a laser projector 2. A beam 38 of electromagnetic waves is emitted from this projector 2. Beams 38 are preferably laser beams but the present invention is not restricted to such beams.

An embodiment for the first operating mode B1 is described in the right partial figure. Operating mode B1 is developed as a non-scanning operating mode in this case. For example, this may be an energy saving mode or standby mode. A non-moving, punctiform image 13 is generated in the process. Projector 2 may be operated as a laser pointer in this case. However, it is possible to use both visible and invisible light beams or laser beams, such as an infrared laser. For a better interaction with projector 2, a visible light source such as a laser in the visible range is advantageous because the user is better able to anticipate optical path 40. Both a light source or a laser in the basic colors red, green or blue of an infrared laser or in the form of a composite laser made up of different colors may be used with an infrared laser but other colors or mixed colors are also encompassed by the present invention. Furthermore, it is also possible to reduce the intensity of light beam 40 from one or a plurality of light sources such as lasers of projector 2 so that projector 2, if operated as a laser pointer, is kept within laser class 1 (for visible lasers within laser class 2) and may thus be operated as a conventional laser pointer.

One preferred embodiment for second operating mode B2 is described in the left partial figure. Scanning projector 2, which is preferably a scanning laser projector, generates an image 13 in a rectangular format. The laser beam of laser projector 2 is scanned line by line and modulated using corresponding image data. Image 13 produced in this manner is projected onto a projection surface 12. Projection surface 12 is flat by way of example, and image 13 corresponds to a rectangular image matrix. In principle, the present invention also encompasses alternative laser-beam controls. An optical path 40 of beams 38 is shown in the left partial figure by its margin positions.

In addition, projector 2 includes a detector unit 3, a processing unit 7, and an A/D converter 15. Detector unit 3 is configured in such a way that the presence of an object 5 in optical path 40 of beam 38 is detected. Preferably, a photodiode, or alternatively a CCD camera, a CMOS camera, ALS, a proximity switch (proximity sensors), or similar devices may be used as detector unit 3. A photodiode may be configured to have a filter property such that it will detect in a certain frequency window, e.g., in the infrared range. A/D converter 15 is used for digitizing the analog measured quantity acquired by detector unit 3. Processing unit 7 is developed to switch from first operating mode B1 to a second operating mode B2 which differs from first operating mode B1 when an object 5 is detected in optical path 40 of beam 38. This is illustrated by a first switch arrow W1 in FIG. 1, which points from the right partial figure to the left partial figure. The switch from an energy saving mode, e.g., first operating mode B1, to second operating mode B2 thus is a wake-up operation.

Figure 2:
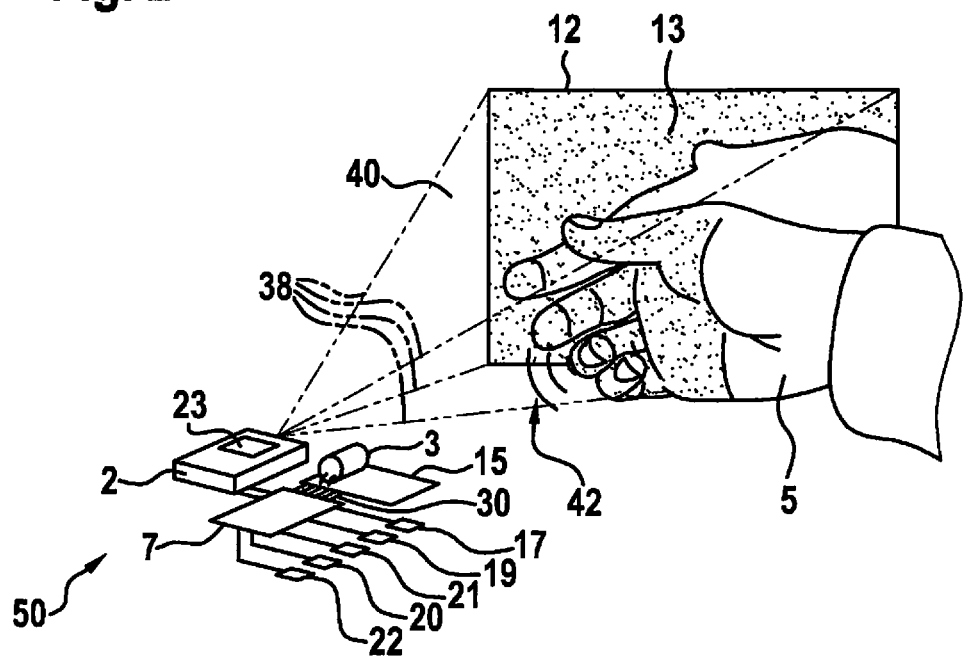
FIG. 2 shows a detailed illustration of a projector according to the present invention.

In second operating mode B2 of projector 2, detector unit 3 is likewise configured to detect the presence of an object 5 in optical path 40 of beam 38. Processing unit 7 is developed to switch from second operating mode B2 to a first operating mode B1 which differs from second operating mode B2 when an object 5 is detected in optical path 40 of beam 38. In FIG. 2 this is illustrated by a second switch arrow W2, which points from the left partial figure to the right partial figure. Alternatively, projector 2 may also automatically change to a first operating mode B1 when an interaction has failed to occur for a longer period of time. In other words, it is advantageously possible to switch back and forth between operating modes B1, B2 as desired.

The initiation of a change in the operating mode by detector unit 3 may be realized by measuring the intensity of reflected light 42 as a measured quantity, an increase in the intensity of reflected light 42 due to an object 5 positioned in optical path 40 being detected, whereupon a signal is transmitted to processing unit 7 with the aid of communications means 30. A swipe through optical path 40 also may be used as an initiator. Toward this end, detector unit 3 is configured in such a way that detector unit 3 generates a signal in response to an increase in the intensity of reflected light 42 due to an object 5 positioned in optical path 40 of laser projector 2 and a subsequent reduction in the intensity of reflected light 42 due to the removal of object 5 from optical path 40 of laser projector 2. Such swiping may preferably be generated using a hand. In principle, however, it is also possible to use other detectable methods such as the detection of gestures by detector unit 3, i.e. an interaction using a movement executed by a person.

The number of configured operating modes may be two, as in the example of FIG. 2. However, this need not be the preferred combination of operating modes B1, B2 implemented in the partial figures of FIG. 1. Included are also additional operating modes that were not explicitly mentioned. However, it is also possible to use more than two operating modes B1, B2. This will then allow for sequential switching between the three or even more operating modes, for instance. In one alternative embodiment, one or more light source(s) of projector 2 may be switched off or have a lower intensity in a first operating mode B1 in comparison with a second operating mode B2. In one further embodiment, the color of the first operating mode B1 differs from the color of second operating mode B2, or in other words, a differentiable frequency is present. Especially in the case of embodiments in which projector 2 is installed in a device 50, preferably a mobile device or mobile telephony device, this results in the option of implementing a color change of laser projector 2 operated as a laser pointer or of forcing a change in intensity of the laser spot in that an object is positioned in beam 38 or a gesture is activated in beam 38, e.g., a swipe through optical path 40. This may constitute an advantageous tool especially when the pointer device is used for demonstration or presentation purposes.

FIG. 2 shows a more detailed embodiment of projector 2 according to the present invention. Projector 2, which is embodied as laser projector 2, is in a scanning operating mode B2, similar to the left partial figure of FIG. 1.

As described in connection with FIG. 1, a beam or laser beam is emitted by projector 2 and an optical path 40, which generates an image 13 on a projection surface 12, is generated with the aid of a mirror module 23. In FIG. 2, only the extreme positions of optical path 40 are illustrated by four beams. An object 5 may be placed or guided in optical path 40 of laser projector 2, which in this instance is a hand of a user by way of example. A reflection of beam 38 or the laser beam takes place at object 5. This reflected light 42 is backscattered in the direction of detector unit 3, among others, and is able to be detected by detector unit 3 with the aid of signal technology. In this particular embodiment, a hand, for instance, is used as object 5. Alternatively, however, object 5 may also be a coffee cup, a pen or some other kitchen device. The present invention is therefore not restricted to certain objects 5.

An A/D converter 15 is made available to laser projector 2, which converts the signal quantity, e.g., the intensity of reflected light 42, acquired by detector unit 3 into a digital signal. The required sampling rate for acquiring light 42 reflected at an object 5 positioned in optical path 40 is less than for the acquisition of scanned image data in a scanning operation. Thus, for example, the sampling rate is advantageously able to be reduced in an energy saving mode, which reduces the power consumption. Detector unit 3, too, is able to be operated in an energy saving mode. By way of example, A/D converter 15 is represented by an analog front end (AFE), which is also configured for conditioning the signal.

A/D converter 15 is able to convey digital signals to processing unit 7 using communications means 30. Communications means 30 may be developed in wired or also in unwired form.

Processing unit 7 is responsible for processing the signals. A memory means 17 in which the different configuration data for the different operating modes B1, B2 are stored or made available, is allocated to processing unit 7. Depending on the number of operating modes B1, B2, these may be two or also even more. A data memory, preferably a persistent, non-volatile memory (NVM), is used as memory means 17.

Memory means 17 is allocated to an ASIC 20 (application-specific integrated circuit) for the voltage supply. A driver 19 may read out the stored configuration data from memory means 17 and implement certain settings in ASIC 20 on the basis of the configuration data. The communication between driver 19 and ASIC 20 and also between driver 19 and a laser driver 22, for instance, is able to be carried out using an SPI (serial peripheral interface) or an I$^2$C (inter-integrated circuit) by way of example. An application 21 that is running on processing unit 7 such as a software application, may be configured in such a way that when a signal from detector unit 3 is detected, driver 19 of a mirror module 23 is instructed to switch laser projector 2 to another operating mode B1, B2. The application may also be developed in such a way that if laser projector 2 is not operated in the energy saving mode, laser projector 2 or driver 19 of mirror module 23 is automatically instructed to switch to one of the provided non-scanning operating modes also when an interaction has not taken place for a longer period of time.

In the executed scanning operating mode, processing unit 7 receives both synchronization signals from ASIC 20 which are required as locating signals for locating object 5 in the scanning operating mode, and the digitized acquired signals from detector unit 3, so that the switch from the scanning operating mode to another operating mode according to the present invention is able to take place. However, processing unit 7 may also be configured in such a way that only the signal from detector unit 3 is considered and not the synchronization signals, so that the switch to another operating mode according to the present invention may also be implemented from the non-scanning operating mode. No transmission of synchronization signals takes place in a non-scanning operating mode.

Figure 3:
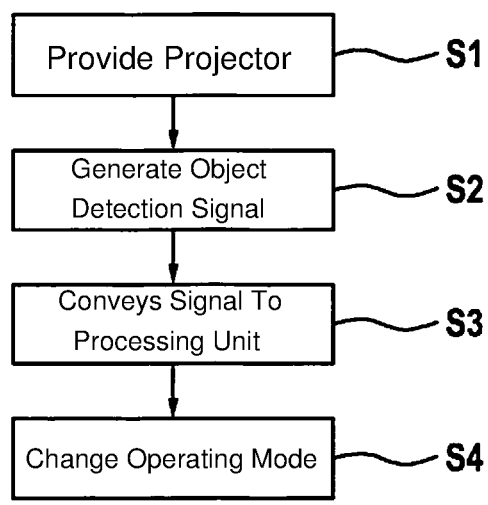
FIG. 3 shows a schematic illustration of the method according to the present invention for the contact-free control of a projector.

In FIG. 3, the method according to the present invention for the contact-free control of a projector 2 is schematically illustrated. In a first step S1, a projector 2 is provided according to one of the realizations described in connection with FIG. 1 and FIG. 2. In a second step S2, a detector unit 3 generates a signal when detector unit 3 detects the presence of an object 5 in the optical path. In a third step S3, the signal is conveyed to a processing unit 7. Based on the signal, operating mode B1, B2 of projector 2 is then changed by processing unit 7 in a fourth step S4.

What is claimed is:

1. A projector adapted to operate in a plurality of operating modes, in which a first operating mode corresponds to the projector emitting a beam of electromagnetic waves, the projector comprising:
   a detector unit that in the first operating mode of the projector is configured in such a way that a presence of an object in an optical path of the beam is detected; and
   a processing unit that switches from the first operating mode to a second operating mode that differs from the first operating mode when the object is detected in the optical path of the beam;
   wherein, in the second operating mode of the projector, the detector unit is configured to detect the presence of a second object in the optical path of the beam, and
   the processing unit switches from the second operating mode to the first operating mode that differs from the second operating mode when the second object is detected in the optical path of the beam.

2. The projector as recited in claim 1, wherein:
   the detector unit detects an intensity of a reflected light, and
   the detector unit generates a signal in response to an increase in the intensity of the reflected light due to the object positioned in the optical path of the beam.

3. The projector as recited in claim 1, wherein:
   the detector unit detects an intensity of a reflected light, and
   the detector unit generates a signal in response to an increase in intensity of the reflected light due to the object being positioned in the optical path of the beam and an ensuing reduction in the intensity of the reflected light due to a removal of the object from the optical path of the beam.

4. The projector as recited in claim 1, wherein the projector is a laser projector.

5. The projector as recited in claim 1, wherein the first operating mode is an energy saving mode.

6. The projector as recited in claim 5, wherein in the energy saving mode of the projector, the detector unit is operable in the energy saving mode.

7. The projector as recited in claim 1, wherein in the first operating mode, the beam is made up of electromagnetic waves in a non-visible range of the spectrum.

8. The projector as recited in claim 1, wherein the detector unit detects a gesture of a user.

9. The projector as recited in claim 1, wherein the second operating mode differs from the first operating mode by a change in a color of the beam.

10. The projector as recited in claim 1, wherein in the second operating mode of the projector the beam is scanned across a projection surface with the aid of a mirror module.

11. The projector as recited in claim 1, wherein the detector unit detects the object in the optical path of the beam with and without synchronization signals.

12. The projector as recited in claim 1, wherein in comparison with the second operating mode, in the first operating mode at least one light source of the projector is switched off or has a lower intensity.

13. The projector as recited in claim 1, wherein the detector unit is a photodiode, a CCD camera, a CMOS camera, or a proximity sensor.

14. The projector as recited in claim 1, wherein the beam is a non-scanning beam in the first operating mode.

15. The projector as recited in claim 14, wherein in the second operating mode of the projector, the beam is scanned across a projection surface with the aid of a mirror module.

16. The projector as recited in claim 1, wherein the second object is the same as the first object.

17. The projector as recited in claim 1, wherein the second object is different from the first object.

18. A projector adapted to operate in a plurality of operating modes, in which a first operating mode corresponds to the projector emitting a beam of electromagnetic waves, the projector comprising:
   a detector unit that in the first operating mode of the projector is configured in such a way that a presence of an object in an optical path of the beam is detected, wherein the beam is a non-scanning beam in the first operating mode; and
   a processing unit that switches from the first operating mode to a second operating mode that differs from the first operating mode when the object is detected in the optical path of the beam, wherein in the second operating mode of the projector the beam is scanned across a projection surface with the aid of a mirror module.

19. A mobile telephony device, comprising:
   a projector adapted to operate in a plurality of operating modes, in which a first operating mode corresponds to the projector emitting a beam of electromagnetic waves, the projector including:
      a detector unit that in the first operating mode of the projector is configured in such a way that a presence of an object in an optical path of the beam is detected, and
      a processing unit that switches from the first operating mode to a second operating mode that differs from the first operating mode when the object is detected in the optical path of the beam;
   wherein, in the second operating mode of the projector, the detector unit is configured to detect the presence of a second object in the optical path of the beam, and
   the processing unit switches from the second operating mode to the first operating mode that differs from the second operating mode when the second object is detected in the optical path of the beam.

20. A method for a contact-free control of a projector, the method comprising:
   in a first operating mode of the projector, the projector emitting a beam of electromagnetic waves, and detecting by a detector unit of the projector a presence of an object in an optical path of the beam;
   in a second operating mode of the projector that differs from the first operating mode, detecting by the detector unit the presence of a second object in the optical path of the beam;
   generating signals using the detector unit when the detector unit detects the presence of the object and the second object in the optical path of the beam;
   conveying the signals to a processing unit; and
   changing a current operating mode of the projector by the processing unit on the basis of the signals, including switching from the first operating mode to the second operating mode in response to detecting the object, and switching from the second operating mode to the first operating mode in response to detecting the second object.

\* \* \* \* \*